(12) United States Patent
Hu et al.

(10) Patent No.: US 7,845,286 B2
(45) Date of Patent: Dec. 7, 2010

(54) TRAILER SYSTEM AND METHOD FOR INSPECTING VEHICLE BY RADIATION IMAGING OF VEHICLE THROUGH TRAILER SYSTEM

(75) Inventors: Bin Hu, Beijing (CN); Wanquan Shen, Beijing (CN); Zhizhong Liang, Beijing (CN); Hua Peng, Beijing (CN); Shangmin Sun, Beijing (CN); Nan Jiang, Beijing (CN); Quanwei Song, Beijing (CN); Weirong Huang, Beijing (CN); Zhenbin Guo, Beijing (CN); Sheng Tang, Beijing (CN); Guang Yang, Beijing (CN)

(73) Assignees: Nuctech Company Limited, Beijing, P.R. (CN); Tsinghua University, Beijing, P.R. (CN)

(*) Notice: Subject to any disclaimer, the term of this patent is extended or adjusted under 35 U.S.C. 154(b) by 85 days.

(21) Appl. No.: 11/966,053

(22) Filed: Dec. 28, 2007

(65) Prior Publication Data

US 2008/0159840 A1 Jul. 3, 2008

(30) Foreign Application Priority Data

Dec. 31, 2006 (CN) .................... 2006 1 0171615

(51) Int. Cl.
*B66F 7/00* (2006.01)
(52) U.S. Cl. ....................... 104/162; 414/427
(58) Field of Classification Search ............ 414/222.01, 414/222.02, 222.08, 679, 678, 689; 254/2 B; 104/162, 172 B
See application file for complete search history.

(56) References Cited

U.S. PATENT DOCUMENTS

| 1,964,119 | A | * | 6/1934 | Hendry | ........................ 414/427 |
| 2,932,258 | A | * | 4/1960 | Marquard | .................... 104/120 |
| 3,035,812 | A | * | 5/1962 | Wineteer | .................... 254/2 R |
| 3,795,336 | A | * | 3/1974 | Acker et al. | ................. 414/458 |
| 3,836,027 | A | * | 9/1974 | Gardner | ...................... 414/427 |
| 5,184,930 | A | * | 2/1993 | Kuhn | .......................... 414/427 |

(Continued)

FOREIGN PATENT DOCUMENTS

CN          1324750          12/2001

(Continued)

*Primary Examiner*—Charles A Fox
(74) *Attorney, Agent, or Firm*—Westman, Champlin & Kelly, P.A.

(57) ABSTRACT

The present invention relates to a trailer system, and particularly to a self-driving trailer system for a radiation imaging inspection system and a method for inspecting a vehicle by radiation imaging of a vehicle through the trailer system. The self-driving trailer system comprises two trailers symmetrical in structure. Each of the trailers comprises a driving device, running wheels, a trailer body, a carrying device, a lift cylinder, a balance wheel, and two pairs of guide wheels. The driving device, the running wheels, and the balance wheel are coupled with the trailer body. The carrying device is coupled with the trailer body through the lift cylinder. A front carrying arm and a rear carrying arm can clamp front wheels of a vehicle under inspection, and move upwards and downwards by the lift cylinder. The trailer system according to the present invention is smooth and reliable in operation and simple in structure, and is applicable to different diameters of wheels of container lorries under inspection and is convenient in operation.

15 Claims, 4 Drawing Sheets

U.S. PATENT DOCUMENTS

| | | | |
|---|---|---|---|
| 5,651,319 A * | 7/1997 | Sugahara | 104/162 |
| 6,106,214 A * | 8/2000 | Saffelle et al. | 414/427 |
| 6,152,154 A * | 11/2000 | Elgharini | 134/71 |
| 6,267,059 B1 * | 7/2001 | Brandt | 104/162 |
| 6,668,730 B2 * | 12/2003 | Goldbeck | 104/162 |
| 6,937,168 B2 * | 8/2005 | Rao et al. | 341/50 |
| 7,207,764 B1 * | 4/2007 | Snook | 414/427 |
| 2004/0146371 A1 * | 7/2004 | Li et al. | 410/3 |
| 2006/0113163 A1 * | 6/2006 | Hu et al. | 198/339.1 |
| 2006/0182563 A1 * | 8/2006 | De Jong et al. | 414/427 |

FOREIGN PATENT DOCUMENTS

| | | |
|---|---|---|
| CN | 1324751 | 12/2001 |
| CN | 1126705 | 11/2003 |
| CN | 1607135 | 4/2005 |
| CN | 1309609 | 2/2007 |
| CN | 1171765 | 10/2007 |

* cited by examiner

TRAILER SYSTEM AND METHOD FOR INSPECTING VEHICLE BY RADIATION IMAGING OF VEHICLE THROUGH TRAILER SYSTEM

The present application claims priority of Chinese patent application Serial No. 200610171615.6, filed Dec. 31, 2006, the content of which is hereby incorporated by reference in its entirety.

BACKGROUND OF THE INVENTION

1. Field of the Invention

The present invention relates to a draft vehicle system, and particularly to a draft vehicle system for a radiation imaging inspection system.

2. Description of the Related Art

With the increasingly wide application of large containerized cargo inspection systems, it has been more and more concerned whether a vehicle under inspection can pass through a scanning passage quickly and safely during inspection since the quick and safe passing of the vehicle is a key factor to vehicle passing rate and application of the system. Conventionally, special traction devices for the inspection systems comprise a flat car, a plate conveyer, small traction vehicles, and the like.

For example, an inspection system has an inspection passage of a length of 60 m and two portions located outside respective ends of the inspection passage and each having a length of 40 m. A traction system for the inspection system is very huge so that the system occupies a large area for civil construction. Further, it is high in cost for manufacturing and mounting components of the system, and is difficult in maintenance. In addition, the system can not randomly be used for inspection at a place different from a spot where the system is located.

Another existing inspection system is configured to have three underground traction vehicles for cycle traction. However, action of the traction vehicles between the ground and the underground makes the system complicated. In addition, when the traction vehicle draws a container car, front wheel of the container car may slip, so that the container car probably drops forwards or rearwards from the traction vehicle to impact and damage the container car and the inspection system.

Chinese Patent Application CN 1324751 A filed by the present applicant discloses an automatic flat car for a stationary container inspection system. In inspection, a vehicle under inspection completely moves onto the automatic flat car. The flat car is equipped with longitudinal and transverse travel mechanisms so that it can moves on a rectangular rail to cycle or reciprocate. The flat car transports vehicles under inspection to pass through a scanning passage. In order to ensure passing rate of vehicles under inspection in the system, one system is generally provided with one or a plurality of automatic flat cars. The automatic flat car bears whole weight (including cargo) of a vehicle under inspection. Due to this, it is huge, complicated in structure, excessive in number of attachments, large in consumption of energy, great in occupied area, and high in manufacturing cost and maintenance cost.

Chinese Patent Application CN 1324750 A filed by the present applicant discloses a plate link chain conveyor for a stationary container inspection system. The conveyor comprises a driving device, a front driving wheel device, a frame, a rear tensioner, and the like. The conveyor is suitable for transporting containers or pelletized cargo, but is inapplicable to traction of trucks under inspection and especially a container lorry with cargo.

Chinese Patent Application CN 1607135A filed by the present applicant discloses a draft vehicle of a draft vehicle system for radiation imaging. A driving device for the draft vehicle includes winches disposed at both ends of an inspection passage, respectively. The winches draw the draft vehicle to pass through the inspection passage by means of steel cable. In inspection, the draft vehicle is locked, and front wheels of a vehicle under inspection move onto the draft vehicle and stop at positioning sockets of the draft vehicle to be positioned. However, the positioning sockets can only abut against the wheels from rear sides of the wheels when the draft vehicle moves, but can not prevent the vehicle under inspection from swinging back and forth because of inertia force generated by starting and stopping the draft vehicle. In addition, in inspection, if rails for the draft vehicle are slightly uneven, speed of the draft vehicle and the vehicle under inspection varies. A design height of the draft vehicle will affect usage of the draft vehicle to a great extent because of limitations of structure. When a container lorry moves onto or leaves the draft vehicle, the draft vehicle sometimes scratches parts of the container lorry such as a chassis and an oil tank to harm the container lorry under inspection. Moreover, when the winch drives the draft vehicle to start and stop, it generates a great impact on the steel cable so that the speed of the vehicle under inspection varies. As a result, image quality is adversely affected. Therefore, a radiation inspection system to which the draft vehicle is applied is poor in reliability, the image quality of the image obtained by the system is unstable, and the system requires high-quality civil construction.

Therefore, the conventional inspection systems has a huge traction system, is complicated in structure, excessive in appurtenant facilities, and large in energy consumption.

SUMMARY OF THE INVENTION

In order to overcome the above defects existing in the prior art, it is an object of the present invention to provide a draft vehicle system which is stable and reliable in operation, simple in structure, and convenient in usage.

In accordance with an aspect of the present application, there is provided a draft vehicle system comprising two draft vehicles disposed opposite to each other, each of the two draft vehicles comprising a draft vehicle body; a carrying device disposed on a side of the draft vehicle body facing a region between the two draft vehicles for lifting and lowering an object and supporting the object during carrying the object by the draft vehicle.

According to another aspect of the present application, there is provided a method for inspecting a vehicle by radiation imaging of the vehicle in a scanning passage through a draft vehicle system. The draft vehicle system comprises two draft vehicles disposed opposite to each other, each of the two draft vehicles comprising a draft vehicle body; and a carrying device disposed on a side of the draft vehicle body facing a region between the two draft vehicles for lifting and lowering a front wheel of the vehicle and supporting the front wheel during carrying the vehicle by the draft vehicle. The method comprises the steps of: lifting the front wheels of the vehicle under inspection by means of the carrying devices of the two draft vehicles, and inspecting the object by radiation scanning of the vehicle while the draft vehicles move.

In accordance with a further aspect of the present application, there is provided a self-driving draft vehicle system comprising two draft vehicles symmetrical in structure, each of the draft vehicles comprising a driving device, running wheels, a draft vehicle body, a carrying device, a lift cylinder, a balance wheel, and two pairs of guide wheels. The driving device, the running wheels, and the balance wheel are coupled with the draft vehicle body. The balance wheel is located at a side of the draft vehicle body outside the running wheels. The carrying device is coupled with the draft vehicle body through the lift cylinder. One pair guide wheels of the two pairs of guide wheels are mounted at a front end of the draft vehicle body and the other pair guide wheels are mounted at a rear end of the draft vehicle body so as to guide the draft vehicle when the draft vehicle runs.

Preferably, the carrying device comprises: a base disposed to the draft vehicle body to be movable upwards and downwards, a front carrying arm assembly and a rear carrying arm assembly coupled with the base to support the object during lifting and lowering the object and carrying the object, wherein the rear carrying arm assembly is substantially horizontally movable and connected with the base.

Preferably, the carrying device comprises: a rear carrying arm assembly moving cylinder for substantially horizontally moving the rear carrying arm assembly.

Preferably, the front carrying arm assembly comprises: a cylinder, a rotary arm, a shaft, a front carrying arm and a sensor disposed on the front carrying arm. The rotary arm is coupled with the shaft through a key, and the shaft is coupled with the front carrying arm through a key. In operation, the cylinder drives the rotary arm to rotate so that the shaft and the front carrying arm are driven to rotate. In operation, the front carrying arm is spread to be positioned at an angle of 90 degrees with respect to the draft vehicle body, and the draft vehicle moves towards a container lorry stopping at an entrance of a scanning passage. When the front carrying arm touches a front wheel of the container lorry under inspection, the sensor sends a signal so that the draft vehicle stops and an addressing action is completed.

Preferably, the rear carrying arm similar to the front carrying arm in configuration is coupled with the base and comprises a cylinder, a rotary arm, a shaft, and a rear carrying arm. The rotary arm is coupled with the shaft through a key, and the shaft is coupled with the rear carrying arm through a key. In operation, the cylinder drives the rotary arm to rotate so that the shaft and the rear carrying arm are driven to rotate, and thus the rear carrying arm is positioned in an operation state or a retracted state.

In operation, the rear carrying arm is positioned at an angle of 90 degrees with respect to the draft vehicle body. The difference between the rear carrying arm and the front carrying arm is that the rear carrying arm and the front carrying arm rotate in opposite directions, respectively, in order that the rear carrying arm and the front carrying arm are positioned in respective operation states. The front carrying arm and the rear carrying arm abut against the front wheel of the container lorry from a front side and a rear side of the wheel, respectively. The rear carrying arm rotates to be positioned at an angle of 90 degrees with respect to the draft vehicle body after the addressing action is completed by the front carrying arm. The rear carrying arm not only can rotate, but also can slide horizontally. A rear carrying arm assembly moving cylinder has a cylinder body connected to the base and a piston rod connected to the rear carrying arm assembly. The piston rod extends and retracts to drive the rear carrying arm assembly to generally horizontally move along base slide grooves disposed in the base. The draft vehicle system can automatically judge whether the front carrying arm and the rear carrying arm have already abutted against the front wheel of the container lorry by setting an operation pressure of the rear carrying arm assembly moving cylinder. If the system determines that the front carrying arm and the rear carrying arm have already abutted against the front wheel, the system sends a signal to stop movement of the piston rod of the rear carrying arm assembly moving cylinder, and the draft vehicle continues the following operations. The front carrying arm and the rear carrying arm are now parallel to each other. Up to now, the draft vehicle has completed the addressing action and the correcting action.

Preferably, the two base slide grooves are disposed in the base of the carrying device, and the rear carrying arm assembly can move horizontally along the base slide grooves by the rear carrying arm assembly moving cylinder.

Preferably, two draft vehicle body slide grooves are disposed in the draft vehicle body and the carrying device can be lifted and lowered by the lift cylinder along the draft vehicle body slide grooves.

Preferably, the system further comprises a self balancing system embodied by a balance wheel. With the balance wheel, frictional force between the draft vehicles and rails for the draft vehicles increases so that weight of the draft vehicles can decrease. The balance wheel, and the front carrying arm and the rear carrying arm are disposed on opposite sides of the running wheels, respectively. In operation, the balance wheel rolls along a groove-shaped track fixed to a foundation for the system. The balance wheel is used to balance the draft vehicle subjected to an overturning moment generated by weight of the container lorry under inspection and the draft vehicle in operation. In addition, a normal force applied by the running wheels of the draft vehicles to the rails for the draft vehicles increases because of the groove-shaped track fixed to the foundation so that the frictional force between the running wheels and the rails increases. As a result, an available power of the driving device of the draft vehicle increases so as to avoid adding weight to the draft vehicle for improving the frictional force, and so as to decrease total weight of the draft vehicle system.

The lift cylinder is used to drive the carrying device to move upwards along the slide grooves formed in the draft vehicle body so that the front wheels of the container lorry under inspection are spaced apart from the ground. The container lorry under inspection is pulled by the draft vehicles to pass through the scanning passage.

According to a still further aspect of the present invention, there is provided an inspection method by radiation imaging of a vehicle by using the self-driving draft vehicle system. The inspection method comprises the following steps:

spreading the front carrying arm to be positioned at an angle of 90 degrees with respect of the draft vehicle body;

moving the draft vehicle and thus the front carrying anti towards the vehicle under inspection, sending a control signal by the sensor when the front carrying arm touches a front wheel of the vehicle under inspection, and stopping the draft vehicle so that an addressing action is completed;

rotating the rear carrying arm to be positioned at an angle of 90 degrees with respect to the draft vehicle body, and horizontally moving the rear carrying arm along the base by the rear carrying arm assembly moving cylinder so that the front carrying arm and the rear carrying arm abut against the front wheel of the vehicle under inspection;

judging, with the draft vehicle system, whether the front carrying arm and the rear carrying arm have clamped the front wheel of the vehicle under inspection at a predetermined clamping force by setting an operation pressure of the rear carrying arm assembly moving cylinder, and sending a signal by the draft vehicle system to stop movement of the piston rod of the rear carrying arm assembly moving cylinder if the system determines that the front carrying arm and the rear carrying arm have clamped the front wheel of the vehicle at the predetermined clamping force;

lifting the carrying device by the lift cylinder so that the front wheel of the vehicle under inspection is spaced apart from the ground, and pulling the vehicle by means of the driving device so that the vehicle is scanned;

lowering the carrying device by the lift cylinder so that the vehicle moves downwards to the ground, after the scanning is completed;

rotating the front carrying arm and the rear carrying arm to be parallel to the passage or to be positioned at an angle of zero degree with respect to the draft vehicle body, and driving the vehicle away from the scanning passage;

moving the draft vehicle toward the entrance of the passage by the driving device, wherein after the front carrying arm and the rear carrying arm rotate to be positioned parallel to the passage or to be positioned at the angle of zero degree with respect to the draft vehicle body, it is not necessary for the draft vehicle to wait until the vehicle leaves the passage and the draft vehicle may move toward the entrance of the passage immediately after the front carrying arm and the rear carrying arm rotate to be positioned parallel to the passage;

rotating the front carrying arm by 90 degrees to be perpendicular to the scanning passage or the draft vehicle body after determining that the vehicle has left the passage and at the same time the draft vehicle continues the moving towards the entrance of the passage;

sending a control signal by the sensor when the front carrying arm touches a front wheel of another vehicle under inspection, and stopping the draft vehicle so that one scanning process is completed, and beginning the next scanning cycle.

Since the front carrying arm and the rear carrying arm can rotate and the rear carrying arm assembly can be translated, it is not necessary for a position of a container lorry under inspection stopping at the entrance of the scanning passage to be very accurate, but the draft vehicle itself looks for and determines a position of a wheel of the container lorry stopping at the entrance. Therefore, accuracy with which a driver stops a container lorry can be lower and operation time of the system for scanning each vehicle can be decreased. In addition, a scanning cycle process can be simplified and the draft vehicle can be applied to different diameters of wheels of vehicles under inspection so as to enlarge applications of the system. Furthermore, since the lift cylinder is used, it is not necessary for a container lorry to be driven onto or away from a draft vehicle so that there is no risk for a chassis of the vehicle to be scraped. As a result, the system is safe and reliable.

The draft vehicle system is smooth and stable in operation, stable in imaging quality, simple in structure and convenient in usage compared with a conventional system. Since the front carrying arm assembly and the rear carrying arm assembly can rotate, it is not necessary for a position of a container lorry under inspection stopping at the entrance of the scanning passage to be very accurate, but the draft vehicle itself looks for and determines a position of the container lorry stopping at the entrance. Therefore, accuracy with which a driver stops a container lorry can be lower and operation time of the system for scanning each vehicle can be decreased. In addition, a scanning cycle process can be simplified, and only two draft vehicles are needed to reciprocate. In addition, since the rear carrying arm assembly can be translated, the system is suitable for different diameters of container lorries under inspection. Furthermore, the frictional force increases and the weight of the system decreases because of the balance wheel.

BRIEF DESCRIPTION OF THE DRAWINGS

These and/or other aspects and advantages of the present invention will become apparent and more readily appreciated from the following description of the embodiments, taken in conjunction with the accompanying drawing.

DETAILED DESCRIPTION OF THE EMBODIMENTS

The embodiments are described below in order to explain the present invention, but do not pose a limitation on the scope of the invention.

Figure 1:
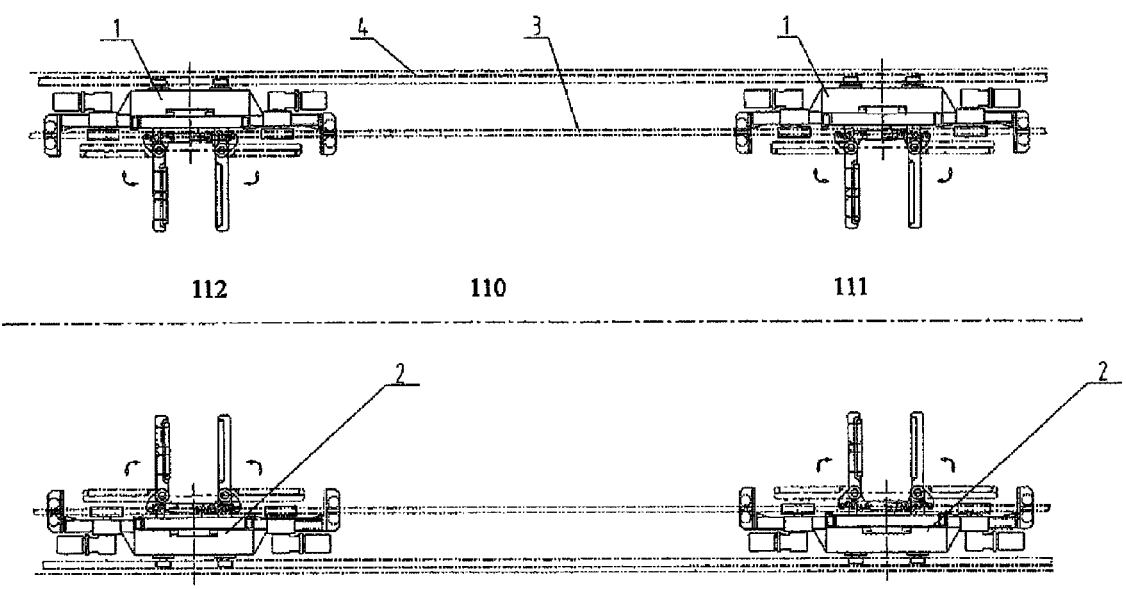
FIG. 1 is a schematic view showing a scanning system to which a draft vehicle system according to the present invention is applied.

FIG. 1 shows a radiation inspection system to which a self-driving system according to the present invention is applied. The self-driving system mainly comprises two draft vehicles 1 and 2 symmetrical in structure. Hereinafter, only one draft vehicle will be described in detail since the draft vehicles 1 and 2 are symmetrical. The draft vehicles 1 and 2 are disposed on both sides of a scanning passage, respectively, and are used to draw front wheels of a container lorry, respectively. In addition, the system is equipped with rails 3, cable drag chains for dragging electrical cables 4, an electrical controller (not shown), a concrete foundation 200, and the like. The draft vehicles are driven to move back and forth along the rails through the electrical cables. The cable drag chains 4 are arranged along the respective rails. When the draft vehicles operate, the cable traction chains 4 and thus the cables are reeled up or out with the movement of the draft vehicles to protect the cables between the draft vehicles and the controller. The traction chains 4 do not drive the draft vehicles to move back and forth. The electrical controller is arranged in a controlling chamber for monitoring and controlling operation of all electromechanical components of the draft vehicle system during inspection.

Figure 2:
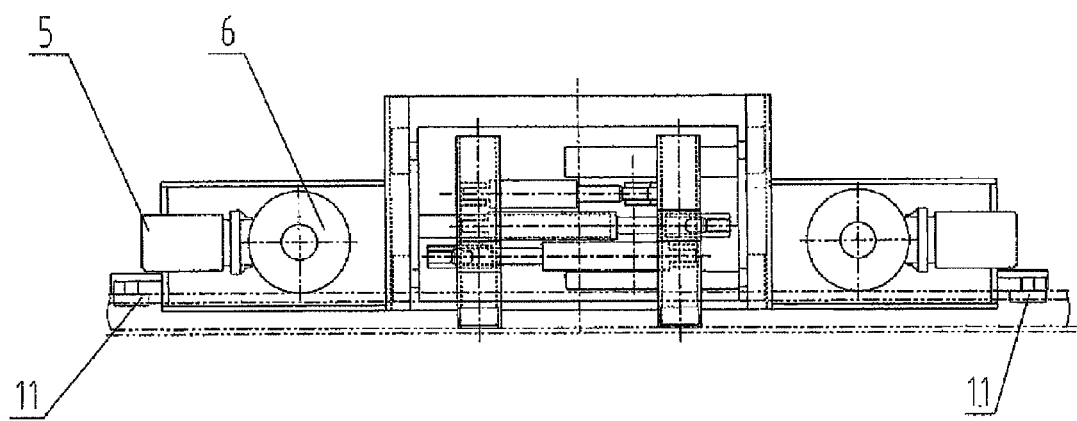
FIG. 2 is a schematic front view showing a draft vehicle according to the present invention.
Figure 3:
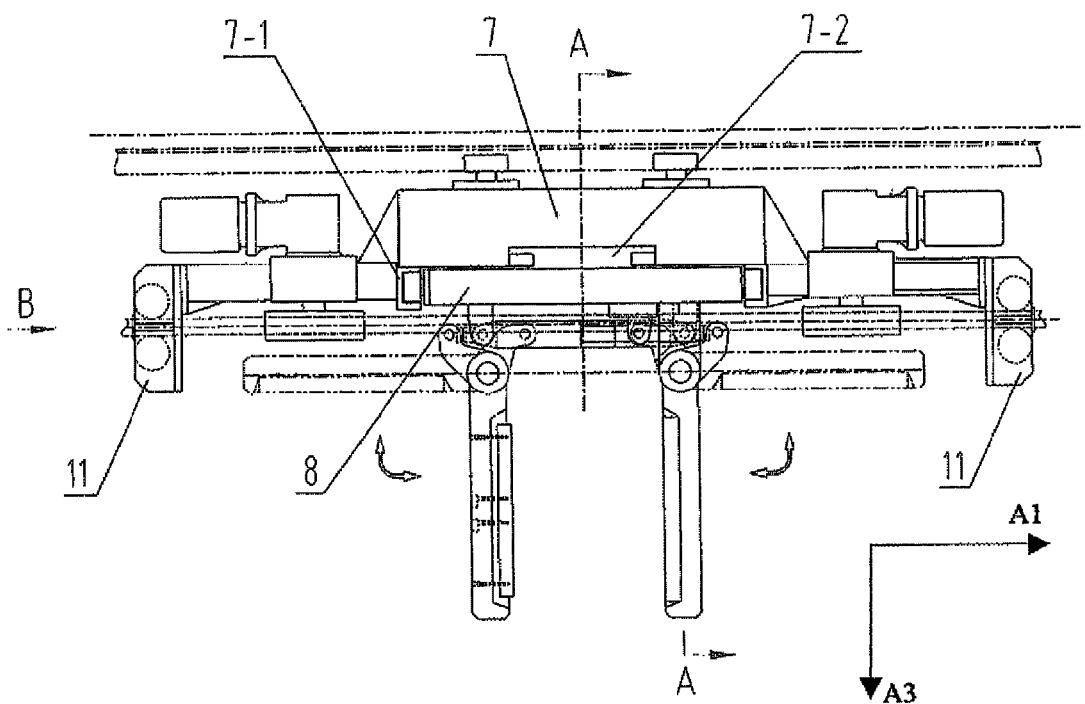
FIG. 3 is a schematic top view showing the draft vehicle according to the present invention.
Figure 4:
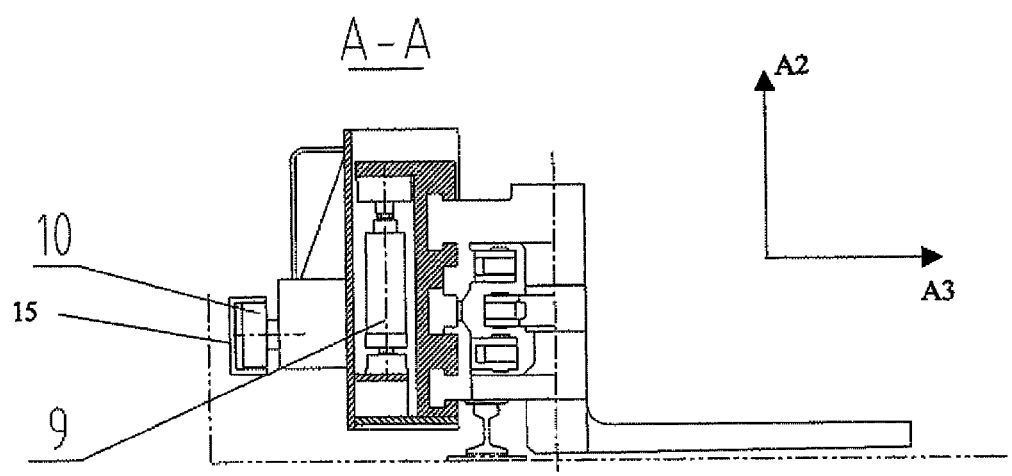
FIG. 4 is a schematic sectional view of FIG. 2.

FIGS. 2 through 4 are a front view, a top view, and a sectional view of the draft vehicle of the self-driving draft vehicle system according to the preset invention. Each of the two draft vehicles 1 and 2 comprises a draft vehicle body 7; a carrying device 8 disposed on a side of the draft vehicle body 7 facing a region between the two draft vehicles (that is, a side facing a center of the scanning passage) for lifting and lowering an object (for example, an object or a vehicle under inspection) and supporting the object during carrying the object by the draft vehicle. Each of the two draft vehicles 1 and 2 may comprise a balance device disposed on the other side of the draft vehicle body opposite to the side for balancing the draft vehicle body 7 when the carrying device 8 lifts and lowers and carries the object. The balance device may comprise any appropriate balance devices such as a counter weight, balance wheel 10 (to be described later), or those known to the art.

In another embodiment, a draft vehicle system of the present invention comprises two draft vehicles 1 and 2 disposed opposite to each other, each of the two draft vehicles comprising a draft vehicle body; and a carrying device 8 disposed on a side of the draft vehicle body facing a region between the two draft vehicles 1 and 2 for lifting and lowering a front wheel of a vehicle and supporting the front wheel during carrying the vehicle by the draft vehicles 1 and 2. A method for inspecting a vehicle by radiation imaging of the vehicle in a scanning passage through the above draft vehicle system comprises steps of: lifting front wheels of the vehicle under inspection by means of the carrying devices 8 of the two draft vehicles 1 and 2, and inspecting the vehicle by radiation scanning of the vehicle while the draft vehicles move.

Figure 5:
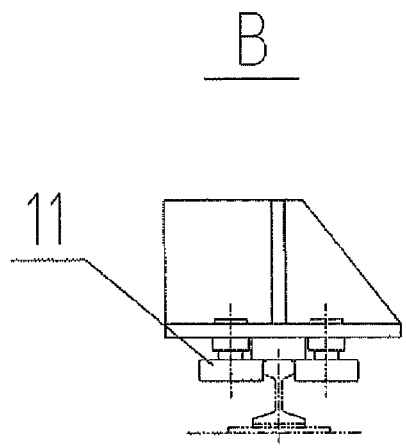
FIG. 5 is a schematic view showing guide wheels of the draft vehicle

In the embodiments shown in FIGS. 2 through 4, the draft vehicle comprises a driving device 5, running wheels 6, a draft vehicle body 7, a carrying device 8, a lift cylinder 9, a balance wheel 10, and two pairs of guide wheels 11. The driving device 5, the running wheels 6, and the balance wheel 10 are coupled with the draft vehicle body 7. The carrying device 8 is coupled with the draft vehicle body 7 through the lift cylinder 9. The lift cylinder 9 is coupled with the draft vehicle body 7 through a bolt. The driving device 5 drives the running wheels 6 to move so that the draft vehicle body 7 moves along the rail together with the carrying device 8, the lift cylinder 9, the balance wheel 10, the guide wheels 11, and the other components. Two pairs of guide wheels 11 are arranged at a front end and a rear end of the draft vehicle body 7, respectively, and two wheels 11 of each pair of guide wheels 11 are disposed on both sides of the rail 3 as shown in FIGS. 2, 3, and 5. The guide wheels 11 are used to guide the running wheels 6 to move along the rail 3 when the draft vehicle runs. The guide wheels 11 roll along both side surfaces of the rail 3 because of frictional force applied to the guide wheels 11 when the guide wheels 11 contact the rail 3. As a result, running resistance to the draft vehicle decreases.

Alternatively, each of the draft vehicles 1 and 2 may be driven to move by winches (not shown) respectively disposed at an entrance 111 and an exit 112 of the scanning passage 110 through steel cables, or by other means known to the art.

Slide grooves 7-1 and 7-2 are disposed in the draft vehicle body 7 so that the lift cylinder 9 can drive the carrying device 8 move upwards and downwards along the slide grooves. It will be appreciated by those skilled in the art that the slide grooves 7-1 and 7-2 suffice for the draft vehicle so long as the carrying device can move up and down along the slide grooves 7-1 and 7-2 in spite of positions and shapes of the slide grooves 7-1 and 7-2.

In addition, two groove-shaped tracks 15 are disposed in the concrete foundation 200 or a ground civil foundation 200 are fixed on both sides of the passage, respectively, and the two balance wheels 10 are disposed on a side of the draft vehicle opposite to the carrying device 8 and are located in the corresponding groove-shaped track 15. In operation, the balance wheels 10 roll along the groove-shaped track 15 fixed to the concrete foundation 200 or the ground civil foundation 200, as shown in FIGS. 3 and 4.

Figure 6:
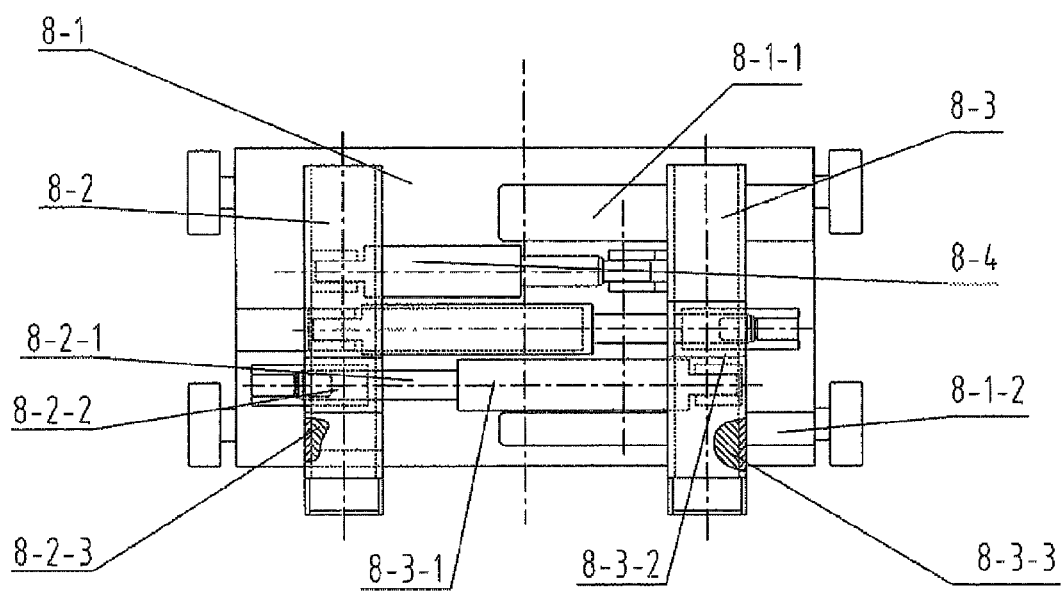
FIG. 6 is a schematic front view showing a carrying device of the draft vehicle.
Figure 7:
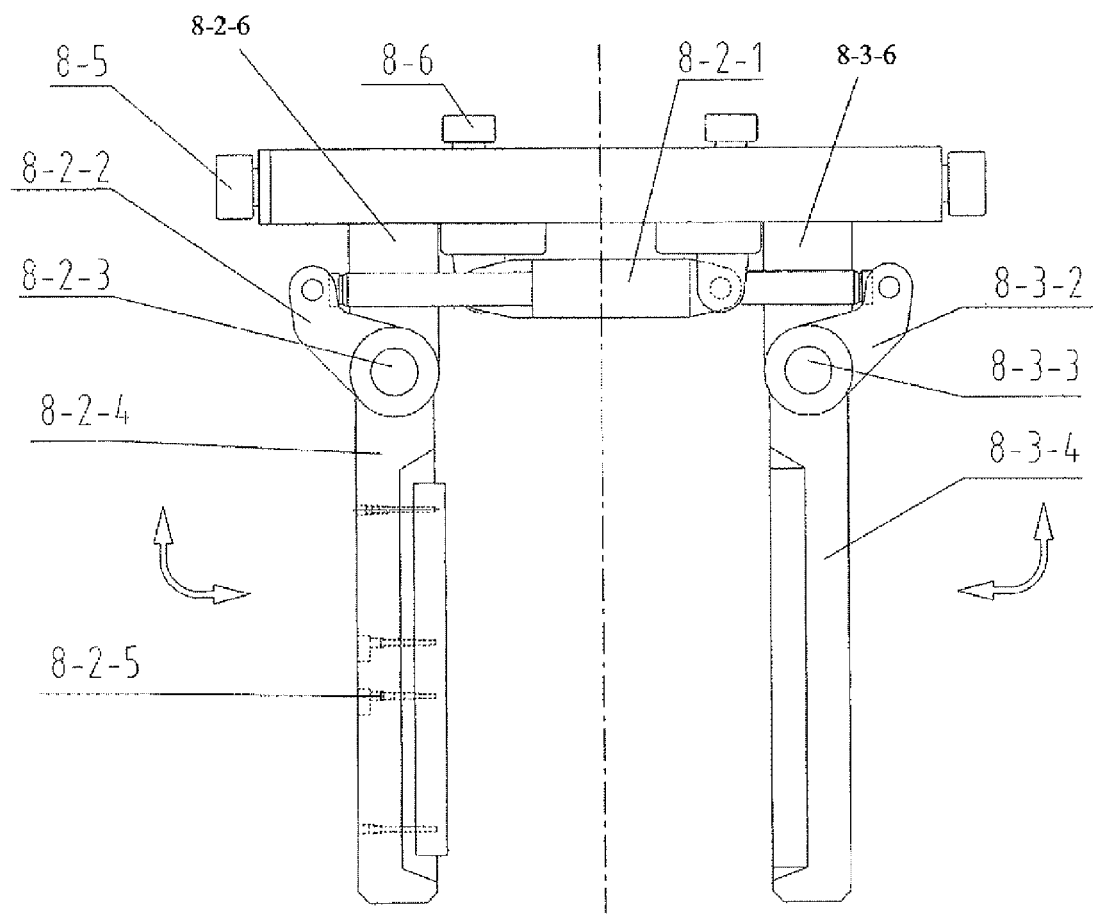
FIG. 7 is a schematic top view showing the carrying device of the draft vehicle.

FIGS. 4 and 6 are a front view and a top view illustrating the carrying device 8. As shown in FIGS. 4 and 6, the carrying device 8 mainly comprises: a base 8-1, a front carrying arm assembly 8-2 and a rear carrying arm assembly 8-3, a rear carrying arm assembly moving cylinder 8-4, and two sliders 8-5 and 8-6. Slide grooves 8-1-1 and 8-1-2 are disposed in the base 8-1. Like the slide grooves 7-1 and 7-2, the slide grooves 8-1-1 and 8-1-2 suffice for the draft vehicle so long as the rear carrying aim assembly 8-3 can move leftward and rightward along the slide grooves 8-1-1 and 8-1-2 in spite of positions and shapes of the slide grooves 8-1-1 and 8-1-2.

The lift cylinder 9 can drive the carrying device 8 to move upwards and downwards along the draft vehicle body so that front wheels of a container lorry can be spaced apart from the ground or be return to the ground. Specifically, the lift cylinder 9 drives the sliders 8-5 and 8-6 of the carrying device 8 move upwards and downwards along the slide grooves 7-1 and 7-2. In addition, engagement of the slider 8-5 and the slide groove 7-1 may constrain swings of the carrying device 8 around a first axis A1 parallel to a moving direction of the draft vehicle and around a second axis A2 which is perpendicular to the first axis A1 and which is vertical during upward and downward movement of the carrying device 8, and engagement of the slider 8-6 and the slide groove 7-2 may constrain swing of the carrying device 8 around a third axis A3 which is perpendicular to the first axis A1 and the second axis A2 and which is horizontal during upward and downward movement of the carrying device 8.

Prior to scanning a container lorry, the lift cylinders 9 of the two draft vehicles lift the carrying devices 8 so that front wheels of the container lorry are spaced apart from the ground. The driving devices 5 drive the respective draft vehicles to pull the container lorry to pass through the scanning passage. After the scanning is completed, the lift cylinders 9 drive the carrying devices 8 to move downwards. As a result, the front wheels of the container lorry moves downwards to the ground. Then, the front carrying arm assemblies 8-2 and the rear carrying aim assemblies 8-3 are spread. A driver gets on the container lorry and drives the container lorry away from the scanning passage.

In the carrying device 8, the front carrying arm assembly 8-2 is coupled with the base 8-1 and comprise a base portion 8-2-6, a cylinder 8-2-1, a rotary arm 8-2-2, a shaft 8-2-3, a front carrying arm 8-2-4 and a sensor 8-2-5 disposed on the front carrying arm. The cylinder 8-2-1 of the front carrying arm assembly 8-2 has a cylinder body rotatably fixed to the base 8-1 with a hinge and a piston rod rotatably connected to one end of the rotary arm 8-2-2 with a hinge. The other end of the rotary arm 8-2-2 and the front carrying arm 8-2-4 are connected with the base portion 8-2-6 through the shaft 8-2-3. The sensor 8-2-5 is mounted on the front carrying arm 8-2-4.

In operation, the cylinder 8-2-1 drives the rotary arm 8-2-2 to rotate around the shaft 8-2-3. The rotary arm 8-2-2 is coupled with the shaft 8-2-3 through a key, and the shaft 8-2-3 is coupled with the front carrying arm 8-2-4 through a key. Therefore, the cylinder 8-2-1 can drive the rotary arm 8-2-2 to rotate so that the rotary arm 8-2-2 drives the shaft 8-2-3 and the front carrying arm 8-2-4 to rotate. In operation, the front carrying arm 8-2-4 is spread to be positioned at an angle of 90 degrees with respect to the draft vehicle body, and the draft vehicle moves towards a container lorry stopping at the entrance 111 of the scanning passage 110. When the front carrying arm 8-2-4 touches a front wheel of the container lorry under inspection, the sensor 8-2-3 sends a signal so that the draft vehicle stops and an addressing action is completed.

Of course, the rotary arm 8-2-2 can be coupled with the shaft 8-2-3 in other manners in lieu of the key connection, and the shaft 8-2-3 can be coupled with the front carrying arm 8-2-4 in other manners in lieu of the key connection.

Similar to the front carrying arm assembly 8-2, the rear carrying arm assembly 8-3 is coupled with the base 8-1 and comprises a base portion 8-3-6, a cylinder 8-3-1, a rotary arm 8-3-2, a shaft 8-3-3, and a rear carrying arm 8-3-4. In operation, the cylinder 8-3-1 drives the rotary arm 8-3-2 to rotate around the shaft 8-3-3. The rotary arm 8-3-2 is coupled with the shaft 8-3-3 through a key, and the shaft 8-3-3 is coupled with the rear carrying arm 8-3-4 through a key. Therefore, the cylinder 8-3-1 can drive the rotary arm 8-3-2 to rotate so that the rotary arm 8-3-2 drives the shaft 8-3-3 and the rear carrying arm 8-3-4 to rotate, and thus the rear carrying arm 8-3-4 is positioned in an operation state or a retracted state. In operation, the rear carrying arm 8-3-4 is positioned at an angle of 90 degrees with respect to the draft vehicle body. The difference between the rear carrying arm and the front carrying arm is that the rear carrying arm and the front carrying arm rotate in opposite directions, respectively, in order that the rear carrying arm and the front carrying arm are positioned in respective operation states. The front carrying arm and the rear carrying arm abut against the front wheel of the container lorry from a front side and a rear side of the wheel, respectively. The rear carrying arm 8-3-4 rotate to be positioned at an angle of 90 degrees with respect to the draft vehicle body after the addressing action is completed by the front carrying arm. The rear carrying arm 8-3-4 can not only rotate, but also can slide horizontally.

FIG. 3 is a view illustrating positions of the front carrying arm and the rear carrying arm positioned at an operation state and a non-operation state, in which imaginary lines indicate the non-operation state in which the front carrying arm and the rear carrying arm are parallel to the scanning passage or the draft vehicle body, solid lines indicate the non-operation state in which the front carrying arm and the rear carrying arm are perpendicular to the passage or the draft vehicle body, and arrows indicate moving directions of the front carrying arm and the rear carrying arm, respectively.

The rear carrying arm assembly moving cylinder 8-4 has a cylinder body connected to the base 8-1 and a piston rod connected to the base portion 8-3-6 of the rear carrying arm assembly 8-3. The piston rod extends and retracts to drive the rear carrying arm assembly 8-3 to generally horizontally move along slide grooves 8-1-1 and 8-1-2 disposed in the base 8-1. The draft vehicle system can automatically judge whether the front carrying arm and the rear carrying arm have already clamped the front wheel of the container lorry at a predetermined clamping force by setting an operation pressure of the rear carrying arm assembly moving cylinder 8-4. If the draft vehicle system determines that the front carrying arm and the rear carrying arm have already clamped the front wheel at the predetermined clamping force, the draft vehicle system sends a signal to stop movement of the piston rod of the rear carrying arm assembly moving cylinder, and the draft vehicle continues the following operations. The front carrying arm and the rear carrying arm are now parallel to each other. Up till now, the draft vehicle has completed the addressing action and the correcting action.

After the above addressing and correction actions are completed, the lift cylinders 9 of the two draft vehicles drive the respective carrying devices 8 to move upwards along the slide grooves 7-1 and 7-2 disposed in the draft vehicle bodies 7, so that the front wheels of the container lorries are spaced apart from the ground. The driving devices 5 drive the respective draft vehicles to pull the container lorry so that the container lorry passes through the scanning passage.

The rear carrying arm assembly moving cylinder 8-4 and the lift cylinder 9 can be any appropriate cylinders known to the art.

Since the front carrying arm 8-2-4 and the rear carrying arm 8-3-4 can rotate and the rear carrying arm assembly can be translated, it is not necessary for a position of a container lorry under inspection stopping at the entrance 111 of the scanning passage 110 to be very accurate, but the draft vehicle itself looks for and determines a position of a wheel of the container lorry stopping at the entrance 111. Therefore, accuracy with which a driver stops a container lorry can be lower and operation time of the draft vehicle system for scanning each vehicle can decrease. In addition, a scanning cycle process can be simplified and the draft vehicle can be applied to different diameters of wheels of vehicles under inspection so as to enlarge applicable range of the system. Furthermore, since the lift cylinder 9 is used, it is not necessary for a container lorry to be driven onto or away from the draft vehicles so that there is no risk for a chassis of the vehicle to be scraped. As a result, the system is safe and reliable.

The self-driving draft vehicle system according to the present invention is also provided with a self-balancing system. With the balancing system, frictional force between the draft vehicles 1 and 2 and the rails 3 increases so that weight of the draft vehicles can decrease. The balance wheels 10 on the draft vehicles, and the front carrying arm and the rear carrying arm are disposed on both sides of the running wheels 6. In operation, the balance wheels 10 roll along the respective groove-shaped track 15 fixed to the foundation 200 for the system. The balance wheels 10 are used to balance the draft vehicle subjected to overturning moment generated by weight of the container lorry under inspection and the draft vehicles in operation. In addition, normal force applied by the running wheels 6 of the draft vehicles to the rails 3 increases because of the groove-shaped track 15 fixed to the foundation 200 so that the frictional force between the running wheels and the rails increases. As a result, an available power of the driving devices of the draft vehicles increases so as to avoid adding weight to the draft vehicles for improving the frictional force, and so as to decrease total weight of the draft vehicle system.

After the scanning is completed, the draft vehicles and the container lorry stop at the exit 112 of the scanning passage 110. The lift cylinder 9 drives the carrying device 8 to move downwards along the draft vehicle body slide grooves 7-1 and 7-2 disposed in the draft vehicle body 7 so that the front wheels of the container lorry moves downwards onto the ground. Then, the cylinders 8-2-1 and 8-3-1 drive the front carrying arm 8-2-4 and the rear carrying arm 8-3-4 to rotate so that the front carrying arm 8-2-4 and the rear carrying arm 8-3-4 are positioned parallel to the passage or the draft vehicle. The container lorry runs away from the scanning passage.

After the front wheels of the container lorry moves downwards onto the ground, and the front carrying arm 8-2-4 and the rear carrying arm 8-3-4 are positioned parallel to the passage or the draft vehicle, the driving device 5 drives the draft vehicle to run towards the entrance of the passage. In a predetermined position of the system, it is automatically detected by a sensor whether the container lorry has left the passage. After it is determined that the container lorry has left the passage, the cylinder 8-2-1 drives the front carrying arm 8-2-4 to rotate by 90 degrees so that the front carrying arm is positioned perpendicular to the passage or the draft vehicle body, and at the same time the draft vehicle continues the movement towards the entrance 111 of the passage 110. When the front carrying arm 8-2-4 touches a front wheel of another container lorry, the sensor 8-2-5 sends a control signal to stop the draft vehicle. Up to now, a complete scanning inspection is finished. The system begins the next scanning cycle.

In addition, the draft vehicle system according to the present invention can be used to pull a container lorry to pass through a scanning passage, and to pull other objects rather than the container lorry for other systems rather than the scanning inspection system. In addition, the present draft vehicle system can use only one draft vehicle rather than two draft vehicles to pull one front wheel of a container lorry in order to achieve the scanning inspection. Therefore, the draft vehicle system can use one draft vehicle.

Although the embodiments of the self-driving draft vehicle system for inspecting a vehicle by radiation-imaging the vehicle and the inspection method by radiation imaging of a vehicle are described, it will be appreciated by those skilled in the art that the draft vehicle system can be applied to other fields to transport vehicles and goods. Therefore, it will be appreciated by those skilled in the art that modifications and applications may be made in these embodiments without departing from the principles and spirit of the general inventive concept, the scope of which is defined in the appended claims and their equivalents.

Therefore, although the above draft vehicle system is applied to the radiation imaging of vehicles, it can be used to transport vehicles and goods for other purposes except the radiation imaging inspection.

In addition, the above draft vehicle system may be provided with one draft vehicle, at least one pair of draft vehicles, or a plurality of draft vehicles.

Although the running wheels run on the rails, the running wheels can runs on other road surfaces or surfaces.

Although the cylinders are used in the draft vehicle system, other driving devices known to the art can be used.

Although the above draft vehicle system is provided with the draft vehicles that reciprocate, it can be provided with a plurality of draft vehicles that run circularly.

Although the rotation range of the front carrying arm and the rear carrying arm is 90 degrees in the above embodiments, the front carrying arm and the rear carrying aim can rotate by any appropriate angles such as an angle of 90 or 120 degrees.

Although the rear carrying arm assembly and the carrying device move along the slide grooves in the above embodiments, the present invention is not limited thereto. For example, the rear carrying arm assembly and the carrying device can move along guides such as tracks and guide rods.

The invention claimed is:

1. A draft vehicle system comprising:
    two draft vehicles disposed opposite to each other, each of the two draft vehicles comprising:
    a draft vehicle body; and
    a carrying device disposed on a side of the draft vehicle body facing a region between the two draft vehicles for lifting and lowering an object and supporting the object, during carrying the object by the draft vehicle,
    wherein the carrying device comprises:
    a base connected with the draft vehicle body to be movable upwards and downwards; and
    a front carrying arm assembly and a rear carrying arm assembly respectively coupled with the base to support the object during lifting and lowering the object and carrying the object,
    wherein the rear carrying arm assembly comprises:
    a base portion coupled with the base to be translated substantially horizontally with respect to the base;
    a rear carrying arm rotatably connected with the base portion of the rear carrying arm assembly,
    a rotary arm fixed to the rear carrying arm to be rotatable about an axis together with the rear carrying arm;
    a cylinder has a piston rod and a cylinder respectively hingedly connected to the rotary arm of the rear carrying arm assembly and the base of the rear carrying arm assembly to drive the rotary arm of the rear carrying arm assembly to rotate so that the rotary arm of the rear carrying arm assembly drives the rear arm to rotate between a spread position and a retracted position.

2. The draft vehicle system according to claim 1, wherein each of the two draft vehicles comprises a balance wheel rotatably connected to the draft vehicle body, and the draft vehicle system further comprises a groove-shaped track adapted to guide the balance wheel, wherein the draft vehicle body is balanced by contact between the balance wheel and the groove-shaped track.

3. The draft vehicle system according to claim 2, wherein the front carrying arm assembly comprises:
    a base portion coupled with the base;
    a front carrying arm rotatably connected with the base portion;
    a rotary arm fixed to the front carrying arm to be rotatable about an axis together with the front carrying arm;
    a cylinder has a piston rod and a cylinder respectively hingedly connected to the rotary arm and the base to drive the rotary arm to rotate so that the rotary arm drives the front carrying arm to rotate between a spread position and a retracted position.

4. The draft vehicle system according to claim 3, wherein the front carrying arm assembly further comprises a sensor coupled with the front carrying arm to detect whether the front carrying arm touches an object.

5. The trailer system according to claim 4, wherein each of the trailers further comprises a rear carrying arm assembly moving cylinder for substantially horizontally moving the rear carrying arm assembly, and two base slide grooves disposed in the base of the carrying device, the rear carrying arm assembly being substantially horizontally movable along the base slide grooves by the rear carrying arm assembly moving cylinder.

6. The draft vehicle system according to claim 3 wherein the front carrying arm of the front carrying arm assembly and the rear carrying arm of the rear carrying arm assembly are disposed on a side of the running wheels, and the balance wheels are disposed on the other side of the running wheel opposite to the side of the running wheels.

7. The draft vehicle system according to claim 6 further comprising running rails on which the draft vehicles run, cable drag chains for dragging electrical cables, a controller for control operation of the draft vehicle system, and a concrete foundation on which the running rails is fixed.

8. The draft vehicle system according to claim 7, wherein each of the draft vehicles further comprises a rear carrying arm assembly moving cylinder for substantially horizontally moving the rear carrying arm assembly, and two base slide grooves disposed in the base of the carrying device, the rear carrying arm assembly being substantially horizontally movable along the base slide grooves by the rear carrying arm assembly moving cylinder.

9. The draft vehicle system according to claim 8 wherein each of the draft vehicles further comprises two draft vehicle body slide grooves disposed in the trailer body, wherein the carrying device can be lifted and lowered along the draft vehicle body slide grooves by a lift cylinder.

10. The draft vehicle system according to claim 1, wherein each of the draft vehicles further comprises:
    running wheels mounted to the draft vehicle body so that the draft vehicle body is movable; and
    a driving device coupled to the draft vehicle body to drive the running wheels to rotate.

11. The draft vehicle system according to claim 10, wherein each of the draft vehicles further comprises:
    a first pair of guide wheels and a second pair of guide wheels respectively disposed at a front end and a rear end of the draft vehicle body to guide the draft vehicle when the draft vehicle runs, wherein the running wheels run on a rail located between the first pair of guide wheels and between the second pair of guide wheels.

12. The draft vehicle system according to claim 1 wherein each of the draft vehicles further comprises two draft vehicle body slide grooves disposed in the draft vehicle body, wherein the carrying device can be lifted and lowered along the draft vehicle body slide grooves by a lift cylinder.

13. The draft vehicle system according to claim 12 wherein the carrying device further comprises two sliders corresponding to the two draft vehicle body slider grooves, the carrying device being movable upwards and downwards in such a manner that the two sliders are positioned in the two draft vehicle body slider grooves, respectively, wherein engagement of one of the two sliders and one of the two draft vehicle body slide grooves can constrain swings of the carrying device around a first axis parallel to a moving direction of the draft vehicle and around a second axis which is perpendicular to the first axis and which is vertical during upward and downward movement of the carrying device, and engagement of the other slider and the other slide groove can constrain swing of the carrying device around a third axis which is perpendicular to the first axis and the second axis and which is horizontal during upward and downward movement of the carrying device.

14. The draft vehicle system according to claim 1 wherein the object comprises a vehicle, and the draft vehicle system is used in an inspection system for inspecting the vehicle by radiation imaging of the vehicle.

15. A draft vehicle system comprising:
a draft vehicle, the draft vehicle comprising:
a draft vehicle body; and
a carrying device disposed on a side of the draft vehicle body for lifting and lowering an object and supporting the object during carrying the object by the draft vehicle,
wherein the carrying device comprises:
a base connected with the draft vehicle body to be movable upwards and downwards; and
a front carrying arm assembly and a rear carrying arm assembly respectively coupled with the base to support the object during lifting and lowering the object and carrying the object,
wherein the rear carrying arm assembly comprises:
a base portion coupled with the base to be translated substantially horizontally with respect to the base;
a rear carrying arm rotatably connected with the base portion of the rear carrying arm assembly,
a rotary arm fixed to the rear carrying arm to be rotatable about an axis together with the rear carrying arm;
a cylinder has a piston rod and a cylinder respectively hingedly connected to the rotary arm of the rear carrying arm assembly and the base of the rear carrying arm assembly to drive the rotary arm of the rear carrying arm assembly to rotate so that the rotary arm of the rear carrying arm assembly drives the rear arm to rotate between a spread position and a retracted position.

* * * * *